(12) United States Patent
Irimie et al.

(10) Patent No.: US 9,800,613 B1
(45) Date of Patent: Oct. 24, 2017

(54) SYSTEMS AND METHODS FOR PERFORMING A SIMULATED PHISHING ATTACK

(71) Applicant: KnowBe4, Inc., Clearwater, FL (US)

(72) Inventors: Alin Irimie, Clearwater, FL (US); Stu Sjouwerman, Bellair, FL (US); Brian Jack, Clearwater, FL (US)

(73) Assignee: KNOWBE4, INC., Clearwater, FL (US)

( * ) Notice: Subject to any disclaimer, the term of this patent is extended or adjusted under 35 U.S.C. 154(b) by 0 days.

(21) Appl. No.: 15/636,135

(22) Filed: Jun. 28, 2017

Related U.S. Application Data

(60) Provisional application No. 62/355,644, filed on Jun. 28, 2016.

(51) Int. Cl.
  *H04L 29/06* (2006.01)
  *H04L 12/58* (2006.01)

(52) U.S. Cl.
  CPC .......... *H04L 63/1483* (2013.01); *H04L 51/18* (2013.01); *H04L 51/22* (2013.01)

(58) Field of Classification Search
  CPC ...... H04L 63/1483; H04L 51/18; H04L 51/22
  See application file for complete search history.

(56) References Cited

U.S. PATENT DOCUMENTS

| | | | | |
|---|---|---|---|---|
| 7,065,555 B2 * | 6/2006 | Foulger | ............... | G06Q 10/107 709/201 |
| 8,041,769 B2 * | 10/2011 | Shraim | ............... | G06Q 10/107 709/206 |

OTHER PUBLICATIONS

Mailgun Team, "Tracking Replies in Mailgun (or any other email service)", May 3, 2012, 5 pages.*
Steve Schlipf, "Email message unique identifier", Aug. 25, 2010, 4 pages.*
Halip et al. "Detection of Steganographic Messages in Email Attachment", Modern Applied Science; vol. 6, No. 11; 2012, pp. 29-34.*

* cited by examiner

*Primary Examiner* — Oleg Korsak
(74) *Attorney, Agent, or Firm* — Christopher J. McKenna; Foley & Lardner LLP

(57) ABSTRACT

Systems and methods for performing a simulated phishing attack are provided. A simulated attack server can send a simulated attack email including a unique identifier to a target. The simulated attack server can receive a reply email including the unique identifier from the target. The simulated attack server can extract the unique identifier from the reply email. The simulated attack server can determine a match between the unique identifier and an identity of the target. The simulated attack server can record a target failure, responsive to determining the match between the unique identifier and the identity of the target.

30 Claims, 9 Drawing Sheets

SYSTEMS AND METHODS FOR PERFORMING A SIMULATED PHISHING ATTACK

RELATED APPLICATIONS

This application claims priority to U.S. Provisional Patent Application No. 62/355,644, filed on Jun. 28, 2016 and entitled "SYSTEMS AND METHODS FOR PERFORMING A SIMULATED PHISHING ATTACK," which is hereby incorporated by reference in its entirety.

FIELD OF THE DISCLOSURE

This disclosure generally relates to systems and methods for performing a simulated phishing attack.

BACKGROUND OF THE DISCLOSURE

It can be useful to perform simulated phishing attacks on an individual or a set of individuals for purposes of extracting information from a device used by the individuals. A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs.

BRIEF SUMMARY OF THE DISCLOSURE

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to extract sensitive information using phishing methods, and any extracted information is used not for malicious purposes, but as part of a process of detecting weaknesses in security. Performing a simulated phishing attack can help expose weaknesses in the security infrastructure meant to protect users and/or devices from phishing attacks or other computerized, cyber, or digital attacks. It may also expose a lack of vigilance and/or know-how in a user or set of users of a device in minimizing risk associated with such attacks. This can allow a security manager to pinpoint specific issues to be resolved and to bolster security as appropriate. A simulated phishing attack may be performed by e.g. a security manager, or by a third party on behalf of a security manager.

A method of performing simulated phishing attacks is as follows. An email is sent to a target's email address. The email can masquerade as an email from a party known to the target, such as an executive of the company that employs the target. Alternatively, the email can appear to be sent from a party unknown to the target. The email may be designed to appear interesting to the recipient, and may offer or promise e.g. access to an interesting tidbit of news, access to useful computer software, access to knowledge of how to perform a money making scheme, or any other thing that may be of interest. In some implementations, the email may request that the target perform a certain action, such as providing sensitive information by replying to the email, or transferring money to an account owned by the attacker and then sending a reply email to confirm that the money has been transferred. In some implementations, each email sent to a target may include a unique identifier. For example, a unique identifier may be a series of numbers and/or letters, or a unique string of characters included in the subject of the email or in the body of the email. In some other examples, the unique identifier may be a unique email address in either the "From:" field or the "Cc:" field of the email. In still other examples, the unique identifier may be included within a separate file that is attached to the email.

The unique identifier can help to determine the identity of a user who replies to an attack email. In implementations in which the unique identifier is included within the subject line of the simulated attack email, the body of the simulated attack email, or a file attached to the simulated attack email, a reply email sent by the target also can include the unique identifier within the subject, the body, or an attachment of the reply email. The reply email can be processed to extract the unique identifier, and the unique identifier can be matched to the target to determine the identity of the target who replied to the email. Thus, even if the reply email is sent from an email address that is not known to be associated with a particular target, the unique identifier can help to determine the identity of the target who replied to the email.

Similarly, in implementations in which the unique identifier is included within an email address in the "From:" or "Cc:" fields of the simulated attack email, a reply email sent by the target also will include the unique identifier within the "To: or "Cc:" fields. The reply email can be processed to extract the unique identifier as discussed above, and the unique identifier can be matched to the target to determine the identity of the target who replied to the email. In some implementations, the simulated attack email may not include a unique identifier in the "From:" or "Cc:" fields. Instead, the reply email address (i.e., the "To:" field of the reply email) may be crafted to include a unique identifier, and the reply email may be processed to extract the unique identifier to determine the identity of the target who replied to the email in a manner similar to that discussed above. Sending a reply email in response to receiving a simulated attack email can be classified as a failure. Therefore, after the identity of the target has been determined, a record of the target's failure can be stored.

In some implementations, a simulated attack email can be sent to a large number of email users. For example, a company may send a simulated attack email to each of its employees. Each simulated attack email may be identical or nearly identical except for the fact that the unique identifiers may differ across all of the simulated attack emails. In such a situation, it may be difficult or impossible to determine the identity of a user who replies to the simulated attack email, particularly if the user replies from an email account different from the account to which the simulated attack email was sent. For example, the simulated attack emails may be sent to the business email addresses of each employee, but one or more employees may reply from their personal email accounts. However, as described above, the use of unique identifiers in the simulated attack emails can facilitate the identification of those who reply to the simulated attack email, regardless of the email addresses used to send the replies.

One aspect of the disclosure is directed to a method for identifying users that reply to a simulated phishing email. The method can include establishing, by one or more servers comprising a processor coupled to memory, a unique identifier for each user of a plurality of users to receive a simulated phishing email via a simulated phishing campaign. The method can include generating, by the one or more servers, for each user of the plurality of users a simulated phishing email to comprise the unique identifier of the respective user embedded in at least one of a subject line of the simulated phishing email, a body of the simulated phishing email or an attachment of the simulated phishing email. The method can include communicating, by the one or more servers, the respective simulated phishing email to an email account corresponding to each user of the plurality of users. The respective simulated phishing email can include an email address in a to field that corresponds to the one or more servers. The method can include receiving, by the one or more servers, a reply email to the email address communicated responsive to the respective simulated phishing email from the email account of at least one user of the plurality of users. The reply email can include the unique identifier. The method can include determining by the one or more servers, that the at least one user has replied to the simulated phishing email by comparing the unique identifier embedded in the reply email to the unique identifier established by the one or more servers for the at least one user.

In some implementations, the unique identifier for each user of a plurality of users can be established by establishing, by the one or more servers, the unique identifier to identify a user corresponding to one or more email accounts. In some implementations, the method further includes generating the simulated phishing email by embedding the unique identifier of the respective user to be invisible in the body of the simulated phishing email. In some implementations, the method further includes generating the simulated phishing email by embedding the unique identifier of the respective user in a file name of the attachment.

In some implementations, the method further includes generating the simulated phishing email by embedding the unique identifier of the respective user in content of the attachment. In some implementations, the method further includes receiving, by the one or more servers, the reply email sent to a domain of or hosted by the one or more servers. In some implementations, the method further includes identifying, by the one or more servers, the unique identifier embedded in at least one of the subject line of the simulated phishing email, the body of the simulated phishing email or the attachment of the simulated phishing email.

Another aspect of the disclosure is directed to a system for identifying users that reply to a simulated phishing email. The system can include one or more servers including a processor coupled to memory, and configured to establish a unique identifier for each user of a plurality of users to receive a simulated phishing email via a simulated phishing campaign. The system can include a campaign manager of the one or more servers configured to generate for each user of the plurality of users a simulated phishing email to include the unique identifier of the respective user embedded in at least one of a subject line of the simulated phishing email, a body of the simulated phishing email or an attachment of the simulated phishing email. The campaign manager also can be configured to communicate the respective simulated phishing email to an email account corresponding to each user of the plurality of users. The respective simulated phishing email can include an email address in a to field that corresponds to the one or more servers. The one or more servers also can be configured to receive a reply email to the email address communicated responsive to the respective simulated phishing email from the email account of at least one user of the plurality of users, the reply email comprising the unique identifier. The campaign manager also can be configured to determine that the at least one user has replied to the simulated phishing email by comparing the unique identifier embedded in the reply email to the unique identifier established by the one or more servers for the at least one user.

In some implementations, the one or more servers can be further configured to establish the unique identifier to identify a user corresponding to one or more email accounts. In some implementations, the campaign manager can be further configured to generate the simulated phishing email by embedding the unique identifier of the respective user to be invisible in the body of the simulated phishing email. In some implementations, the campaign manager can be further configured to generate the simulated phishing email by embedding the unique identifier of the respective user in a file name of the attachment.

In some implementations, the campaign manager can be further configured to generate the simulated phishing email by embedding the unique identifier of the respective user in content of the attachment. In some implementations, the one or more servers can be further configured to receive the reply email sent to a domain of or hosted by the one or more servers. In some implementations, the campaign manager can be further configured to identify the unique identifier embedded in at least one of the subject line of the simulated phishing email, the body of the simulated phishing email or the attachment of the simulated phishing email.

Another aspect of the disclosure is directed to a method for identifying users that reply to a simulated phishing email. The method can include establishing, by one or more servers comprising a processor coupled to memory, a unique identifier for each user of a plurality of users to receive a simulated phishing email via a simulated phishing campaign. The method can include generating, by the one or more servers, for each user of the plurality of users a simulated phishing email to comprise the unique identifier of the respective user embedded in an email address of one of a plurality of address fields of the simulated phishing email. The method can include communicating, by the one or more servers, the respective simulated phishing email to an email account corresponding to each user of the plurality of users. The respective simulated phishing email can include an email address in a to field that corresponds to the one or more servers. The method can include receiving, by the one or more servers, a reply email to the email address communicated responsive to the respective simulated phishing email from the email account of at least one user of the plurality of users. The reply email can include the unique identifier in an address field of the plurality of address fields. The method can include determining by the one or more servers, that the at least one user has replied to the simulated phishing email by comparing the unique identifier embedded in the email address field of the reply email to the unique identifier established by the one or more servers for the at least one user.

In some implementations, the method can further include establishing, by the one or more servers, the unique identifier to identify one or more email accounts. In some implementations, the method can further include generating the simulated phishing email by embedding the unique identifier of the respective user in a to field of the simulated phishing email. In some implementations, the method can further include generating the simulated phishing email by embedding the unique identifier of the respective user in a cc field of the simulated phishing email.

In some implementations, the method can further include generating the simulated phishing email by embedding the unique identifier of the respective user prior to an @ sign in the email address in one of the plurality of address fields. In some implementations, the method can further include generating the simulated phishing email by embedding the unique identifier of the respective user after an @ sign in the email address in one of the plurality of address fields. In some implementations, the method can further include receiving, by the one or more servers, the reply email sent to a domain of or hosted by the one or more servers. In some implementations, the method can further include identifying, by the one or more servers, the unique identifier embedded in the address field of the simulated phishing email comprising one of a from field or a cc field.

Another aspect of the disclosure is directed to a system for identifying users that reply to a simulated phishing email. The system can include one or more servers comprising a processor coupled to memory and configured to establish a unique identifier for each user of a plurality of users to receive a simulated phishing email via a simulated phishing campaign. The system can include a campaign manager of the one or more servers configured to generate for each user of the plurality of users a simulated phishing email including the unique identifier of the respective user embedded in an email address of one of a plurality address fields of the simulated phishing email, and to communicate the respective simulated phishing email to an email account corresponding to each user of the plurality of users. The respective simulated phishing email can include an email address in a to field that corresponds to the one or more servers. The one or more servers can be configured to receive a reply email to the email address communicated responsive to the respective simulated phishing email from the email account of at least one user of the plurality of users. The reply email can include the unique identifier in an address field of the plurality of address field. The campaign manager can be further configured to determine that the at least one user has replied to the simulated phishing email by comparing the unique identifier embedded in the address field of the reply email to the unique identifier established by the one or more servers for the at least one user.

In some implementations, the one or more servers can be further configured to generate the unique identifier to identify one or more email accounts. In some implementations, the campaign manager can be further configured to generate the simulated phishing email by embedding the unique identifier of the respective user in a to field of the simulated phishing email. In some implementations, the campaign manager can be further configured to generate the simulated phishing email by embedding the unique identifier of the respective user in a cc field of the simulated phishing email.

In some implementations, the campaign manager can be further configured to generate the simulated phishing email by embedding the unique identifier of the respective user prior to an @ sign in the email address in one of the plurality of address fields. In some implementations, the campaign manager can be further configured to generate the simulated phishing email by embedding the unique identifier of the respective user after an @ sign in the email address in one of the plurality of address fields. In some implementations, the one or more servers can be further configured to receive the reply email sent to a domain of or hosted by the one or more servers. In some implementations, the campaign manager can be further configured to identify the unique identifier embedded in the address field of the simulated phishing email comprising one of a from field or a cc field.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods of performing simulated phishing attacks.

A. Computing and Network Environment

Figure 1A:
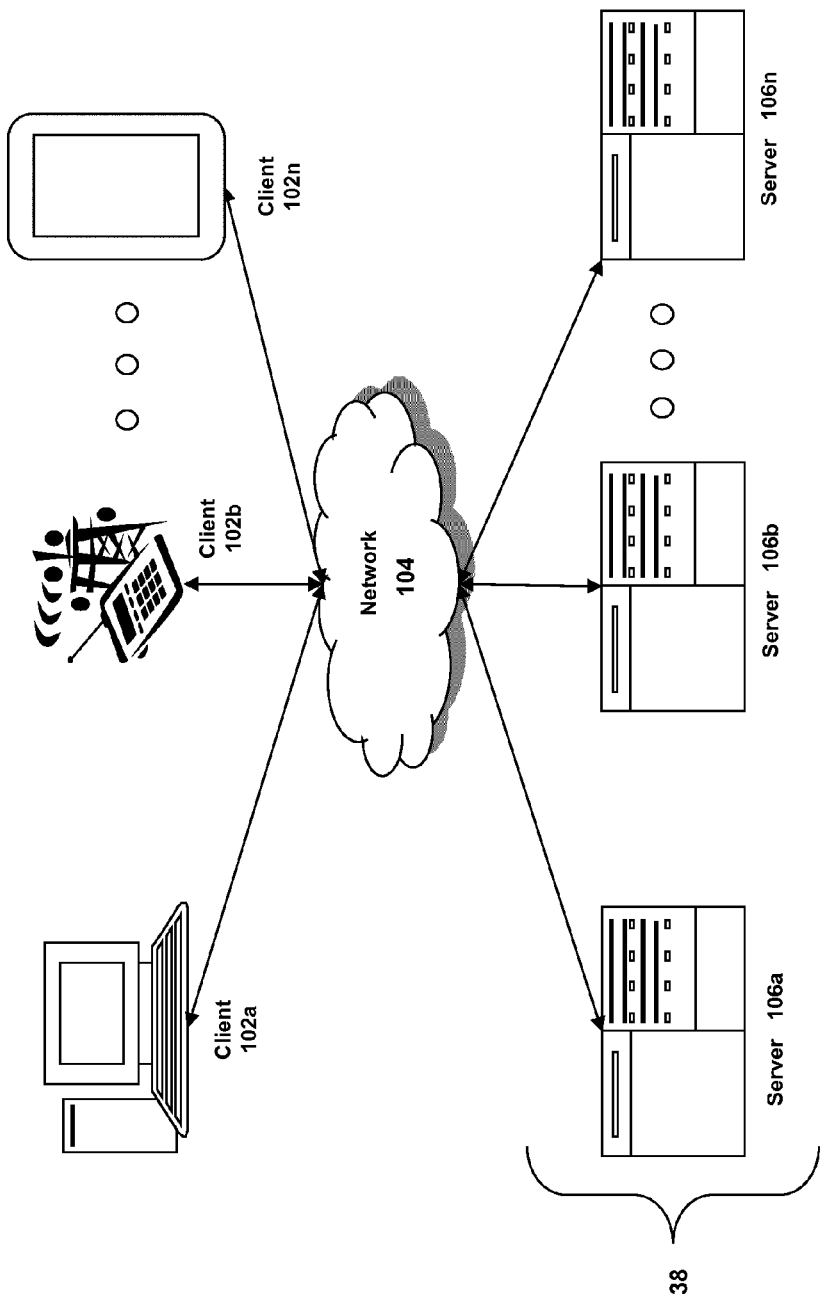
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
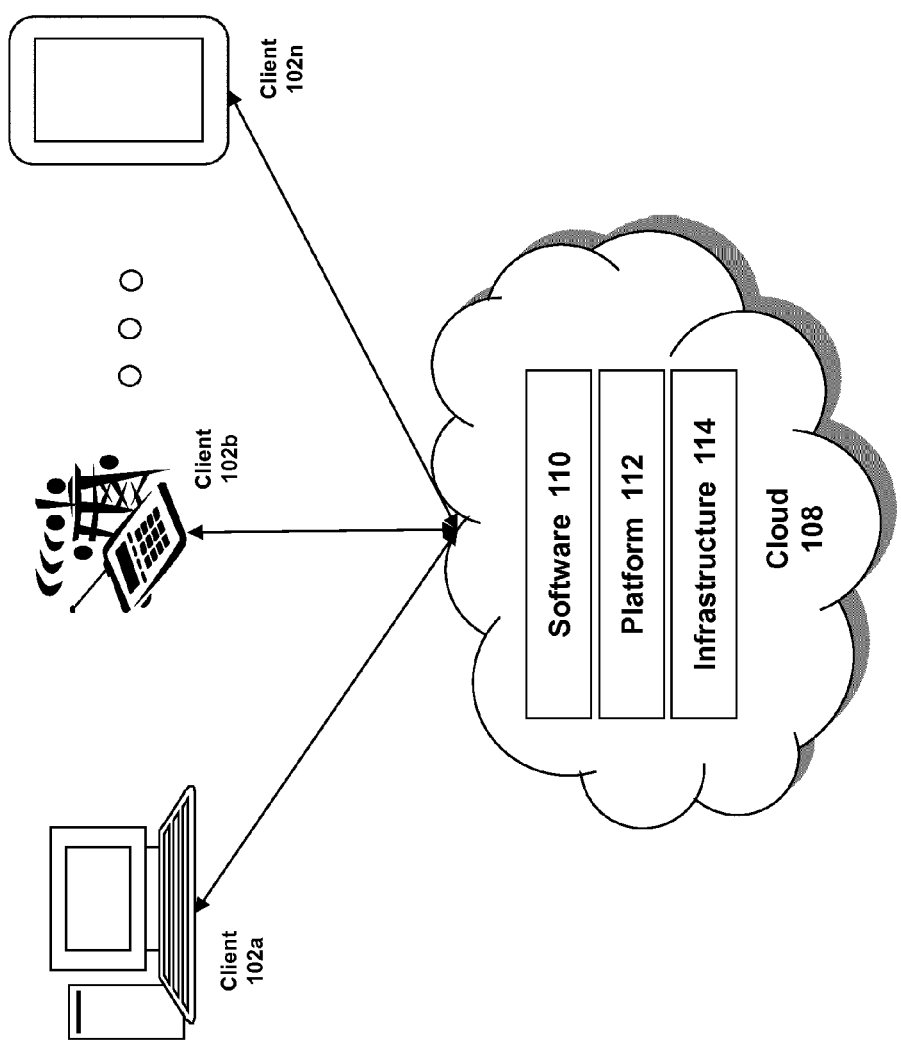
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
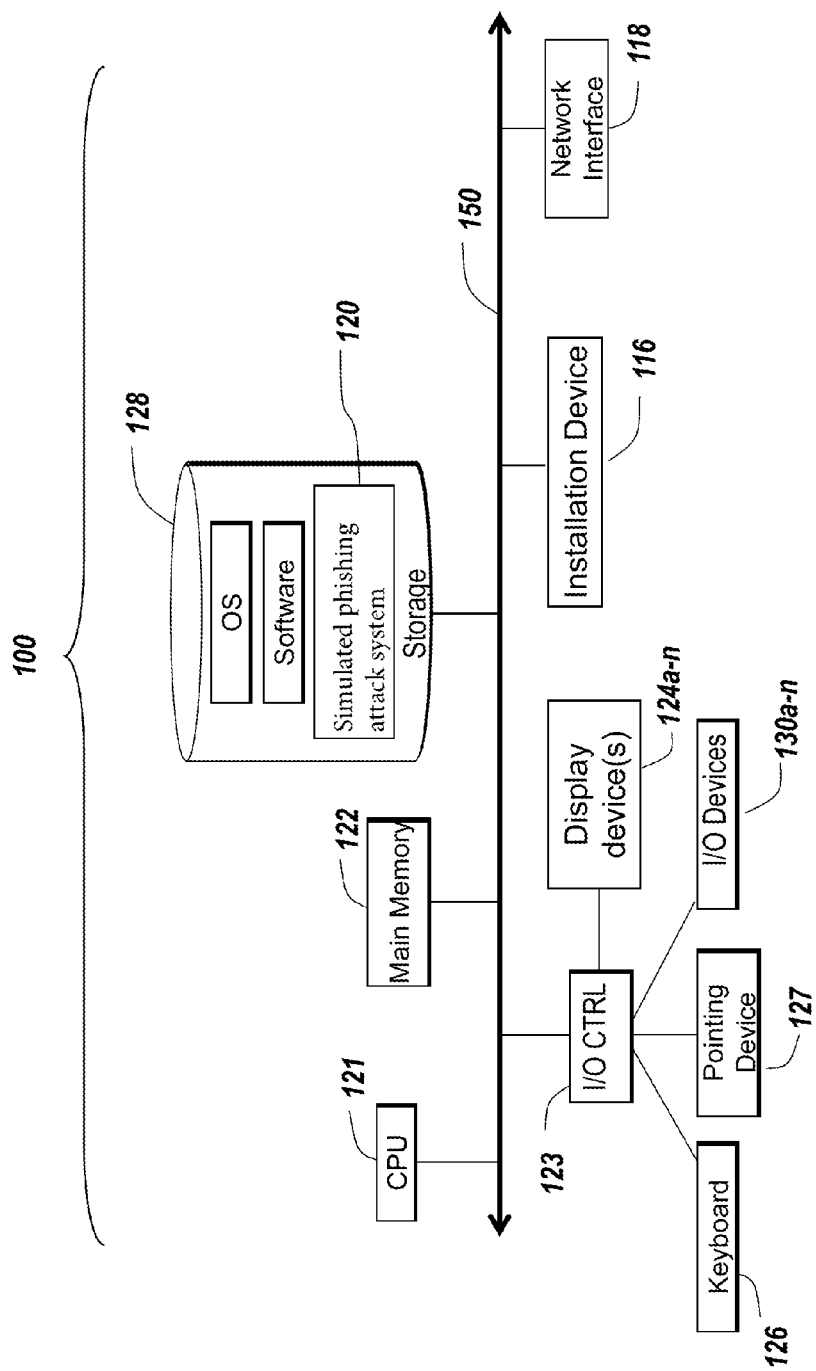
FIGS. 1C and 1D are block diagrams depicting embodiments of computing devices useful in connection with the methods and systems described herein.
Figure 1D:
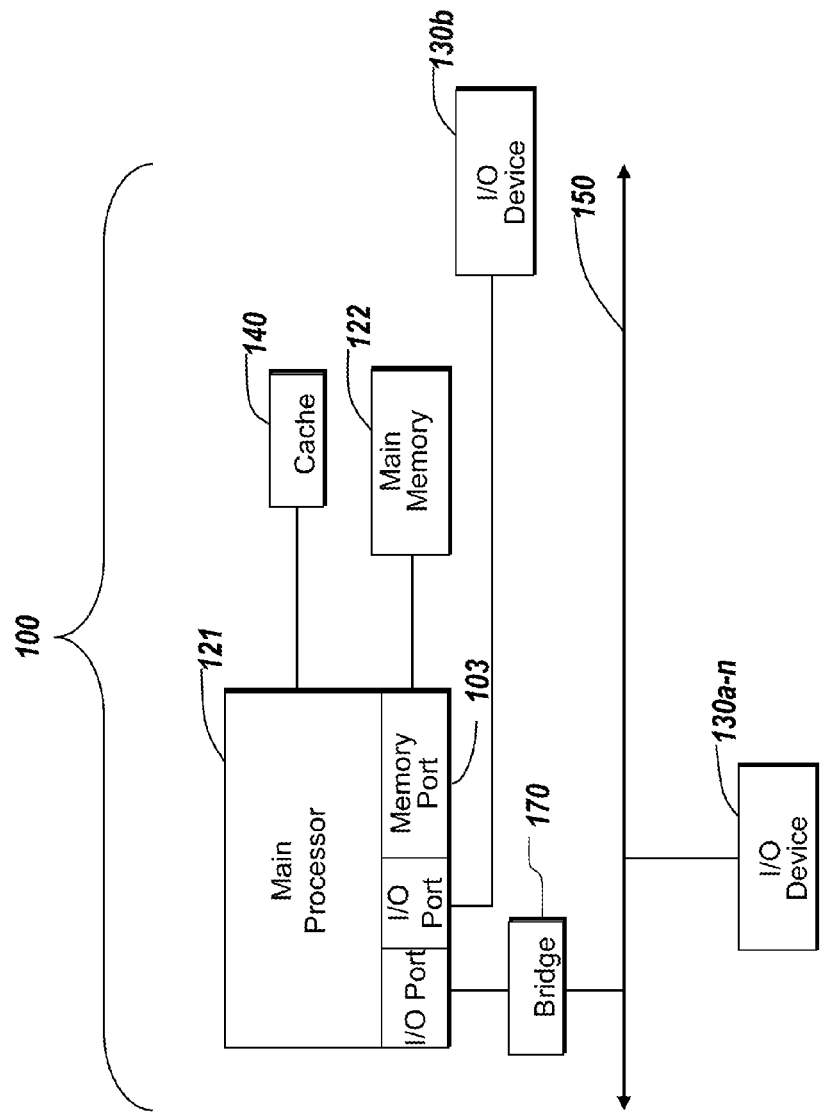

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAIVI), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as a installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Performing Simulated Phishing Attacks

The following describes systems and methods of performing simulated phishing attacks.

Systems and methods of the present solution are directed to performing simulated phishing attacks. These systems and methods allow for the sender of a reply to a simulated phishing attack email to be determined. This allows the identity of a target who fails a test by replying to a simulated phishing attack to be identified, regardless of the email account the target uses to send the reply email.

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to extract sensitive information using phishing methods, and any extracted information is used not for malicious purposes, but as part of a process of detecting weaknesses in security. Performing a simulated phishing attack can help expose weaknesses in the security infrastructure meant to protect users and/or devices from phishing attacks or other computerized, cyber, or digital attacks. It may also expose a lack of vigilance and/or know-how in a user or set of users of a device in minimizing risk associated with such attacks. This can allow a security manager to pinpoint specific issues to be resolved and to bolster security as appropriate. A simulated phishing attack may be performed by e.g. a security manager, or by a third party on behalf of a security manager.

A method of performing simulated phishing attacks is as follows. An email is sent to a target's email address. The email can masquerade as an email from a party known to the target, such as an executive of the company that employs the target. Alternatively, the email can appear to be sent from a party unknown to the target. The email may be designed to appear interesting to the recipient, and may offer or promise e.g. access to an interesting tidbit of news, access to useful computer software, access to knowledge of how to perform a money making scheme, or any other thing that may be of interest. In some implementations, the email may request that the target perform a certain action, such as providing sensitive information by replying to the email, or transferring money to an account owned by the attacker and then sending a reply email to confirm that the money has been transferred. In some implementations, each email sent to a target may include a unique identifier. For example, a unique identifier may be a series of numbers and/or letters, or a unique string of characters included in the subject of the email or in the body of the email. In some other examples, the unique identifier may be a unique email address in either the "From:" field or the "Cc:" field of the email. In still other examples, the unique identifier may be included within a separate file that is attached to the email. In some implementations, the unique identifier may be embedded in a simulated attack email in a manner that renders the unique identifier invisible or nearly invisible in a body of the simulated attack email.

The unique identifier can help to determine the identity of a user who replies to an attack email. In general, each user may be associated with a respective email account. Thus, the unique identifiers established in a campaign may each be considered as corresponding to a respective one of the plurality of users, or a respective one of the plurality of email accounts associated with the users. In implementations in which the unique identifier is included within the subject line of the simulated attack email, the body of the simulated attack email, or a file attached to the simulated attack email, a reply email sent by the target also can include the unique identifier within the subject, the body, or an attachment of the reply email. The reply email can be processed to extract the unique identifier, and the unique identifier can be matched to the target to determine the identity of the target who replied to the email. Thus, even if the reply email is sent from an email address that is not known to be associated with a particular target, the unique identifier can help to determine the identity of the target who replied to the email.

Similarly, in implementations in which the unique identifier is included within an email address in the "From:" or "Cc:" fields of the simulated attack email, a reply email sent by the target also will include the unique identifier within the "To: or "Cc:" fields. The reply email can be processed to extract the unique identifier as discussed above, and the unique identifier can be matched to the target to determine the identity of the target who replied to the email. In some implementations, the simulated attack email may not include a unique identifier in the "From:" or "Cc:" fields. Instead, the reply email address (i.e., the "To:" field of the reply email) may be crafted to include a unique identifier, and the reply email may be processed to extract the unique identifier to determine the identity of the target who replied to the email in a manner similar to that discussed above. Sending a reply email in response to receiving a simulated attack email can be classified as a failure. Therefore, after the identity of the target has been determined, a record of the target's failure can be stored.

In some implementations, a simulated attack email can be sent to a large number of email users. For example, a company may send a simulated attack email to each of its employees. Each simulated attack email may be identical or nearly identical except for the fact that the unique identifiers may differ across all of the simulated attack emails. In such a situation, it may be difficult or impossible to determine the identity of a user who replies to the simulated attack email, particularly if the user replies from an email account different from the account to which the simulated attack email was sent. For example, the simulated attack emails may be sent to the business email addresses of each employee, but one or more employees may reply from their personal email accounts. However, as described above, the use of unique identifiers in the simulated attack emails can facilitate the identification of those who reply to the simulated attack email, regardless of the email addresses used to send the replies.

Figure 2:
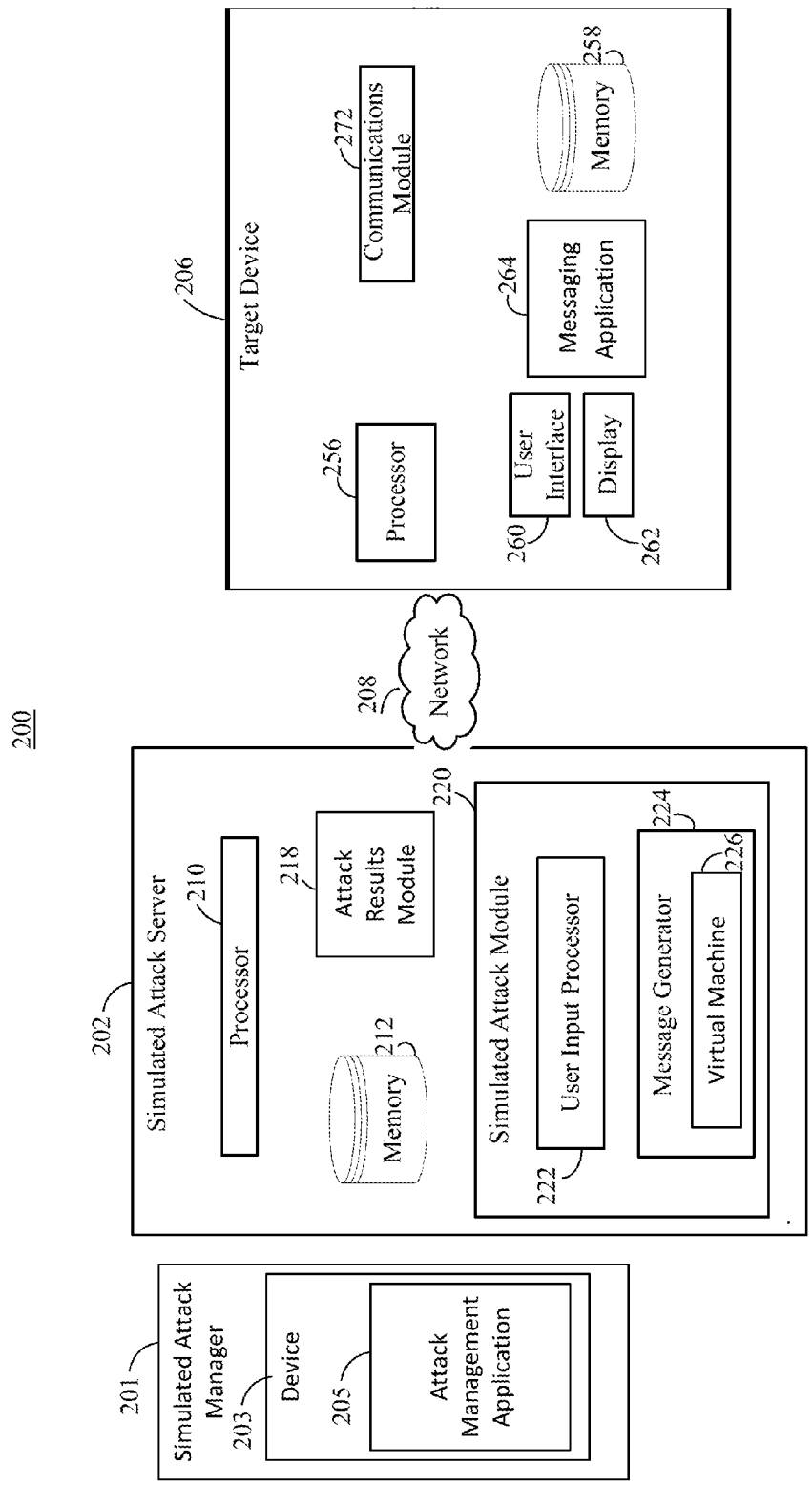
FIG. 2 depicts an implementation of some of the architecture of an implementation of a system capable of performing a simulated phishing attack.

Referring to FIG. 2 in a general overview, FIG. 2 depicts some of the architecture of an implementation of a system 200 capable of performing simulated phishing attack. In some implementations, the system 200 includes a simulated attack manager 201, a simulated attack server 202, a target device 206, and a network 208 allowing communication between these system components.

In an implementation, a simulated attack manager 201 may be e.g., a security manager, a third party security consultant, a risk assessor, or any other party. The simulated attack manager 201 may wish to direct a simulated phishing attack by interacting with a simulated attack server 202 through an attack management application 205 installed on a device 203. The device 203 may be, for example, a desktop computer, a laptop computer, a mobile device, or any other suitable computing device. The attack management application 205 may be e.g., an application on a device that allows for a user of the device to interact with the simulated attack server 202 for e.g. purposes of tailoring and/or executing a simulated phishing attack and/or viewing and/or processing and/or analyzing the results of a phishing attack.

In an implementation, the attack management application 205, when executed on the device 203, causes e.g. a graphical user interface to be displayed to e.g. the simulated attack manager 201. In other implementations, the attack management application 205 allows for user input through a non-graphical user interface, e.g. a user interface that accepts text or vocal input without displaying an interactive image. A graphical user interface may be displayed on a screen of a mobile phone, or a monitor connected to a desktop or laptop computer, or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a user device capable of opening a network connection to simulated attack server 202, or may be any other type of interface.

In an implementation, the simulated attack manager 201 may make choices concerning how a simulated phishing attack is to be carried out. For example, a graphical user interface run by the attack management application 205 may be displayed to the simulated attack manager 201 on a display of the device 203. The simulated attack manager 201 may input parameters for the attack that affect how it will be carried out. For example, the simulated attack manager 201 may make choices as to which users to include as potential targets in the attack, the method of determining which users are to be selected as targets of the attack, the timing of various aspects of the attack, whether to use an attack template that includes values for one or a plurality of attack parameters, how responses from targeted users should be uniquely identified, and other choices. These choices may be made by e.g. selecting options displayed on a graphical user interface from dropdown menus, being presented with choices through a simulated attack wizard, or in any other appropriate manner.

In an implementation, the attack management application 205 may allow the simulated attack manager 201 to access and/or change settings of an account maintained with any party involved with the attack, such as, for example, a third party security service provider, or a party that manages an exploit server 204, or may allow the attack management application 205 to access and/or change settings of an account maintained with a third party security service provider, such as one that e.g. manages an exploit server, view bills and/or make payments to a third party security service provider, to perform these functions with other third parties involved in the attack, or provide any other functions that would be appropriate for facilitating communications between the simulated attack manager 201 and any other parties involved in the attack.

In an implementation, system 200 includes a simulated attack server 202. The simulated attack server 202 may be a part of a cluster of simulated attack servers. In some implementations, tasks performed by the simulated attack server 202 may be performed by a plurality of simulated attack servers. These tasks may be allocated among the cluster of servers by an application, service, daemon, routine, or other executable logic for task allocation. The simulated attack server 202 may include a processor 210 and memory 212.

In some implementations, the simulated attack server 202 may include a simulated attack module 220. The simulated attack module 220 may manage various aspects of a simulated phishing attack. For example, the simulated attack module 220 may process input from the simulated attack manager 201, may provide access as needed to various applications, modules, and other software components of the simulated attack server 202 to other various applications, modules, and other software components of the simulated attack server 202, may monitor and control timing of various aspects of a simulated attack, may process requests for access to attack results, or may perform other tasks related to the management of a simulated attack.

In some implementations, the simulated attack module 220 may include a user input processor 222. The user input processor 222 may receive input from e.g. the simulated attack manager 201 using e.g. the attack management application 205 to manage a simulated phishing attack. The user input processor 222 may be, for example, a library, application programming interface (API), set of scripts, or any other code that may be accessed by, or executed via a network connection by, or provide callback methods for, the attack management application 205.

In an implementation, the user input processor 222 may be integrated with the memory 212. The memory 212 may store data such as parameters and scripts associated with a particular simulated phishing attack. For example, the memory 212 may store a set of parameters and scripts corresponding to the choices made by a simulated attack manager 201 through a attack management application 205, e.g. as described above, for a particular phishing attack.

In an implementation, the simulated attack module 220 includes a message generator 224. The message generator 224 may be integrated with the memory 212 so as to provide the message generator 224 accesses to parameters associated with messaging choices made for a particular simulated attack by e.g. the simulated attack manager 201. The message generator 224 may be an application, service, daemon, routine, or other executable logic for generating messages. The messages generated by the message generator 224 may be of any appropriate format. For example, they may be email messages, text messages, messages used by particular messaging applications such as, e.g., WhatsApp™, or any other type of message. Message type to be used in a particular attack may be selected by e.g. a simulated attack manager 201 using an attack management application 205. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine 226, or may simply be run on an operating system of the simulated attack server 202, or may be run in any other appropriate environment.

In some implementations, the message generator 224 can be configured to generate messages having characteristics that facilitate identification of targeted users who reply to the messages. As described above, the message generator 224 can achieve this by establishing a unique identifier and including the unique identifier in each simulated attack email sent to a target and/or by ensuring that each reply email sent from a targeted user will include a unique identifier associated with the target. FIGS. 3A-3E depict a series of example simulated phishing attack emails and replies to simulated phishing attack emails. The simulated attack emails can be generated, for example, by the message generator 224. FIGS. 3A-3E are described further below together with reference to the message generator 224. It should be understood that the features of the emails depicted in FIGS. 3A-3E are illustrative only, and are not intended to limit the scope of this disclosure.

Figure 3A:
FIGS. 3A-3E depict a series of example simulated phishing attack emails and replies to simulated phishing attack emails.
Figure 3A:
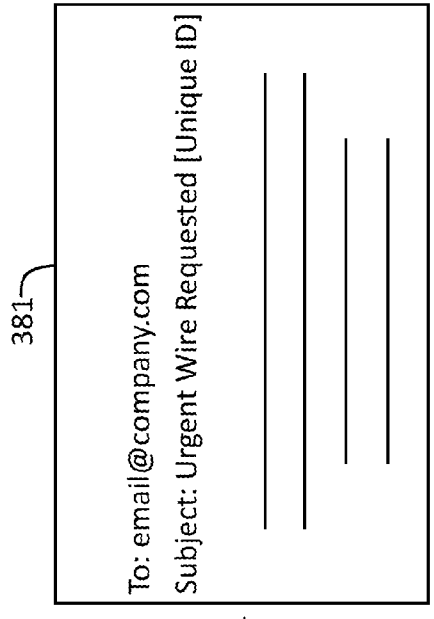

In some implementations, the message generator 224 can be configured to generate the simulated attack email 375 shown in FIG. 3A. The email can appear to be delivered from a trusted email address, such as the email address of an executive of the company at which the target is employed. In addition, the email 375 can have a "Subject:" field that is intended to be cause the recipient to take an action, such as initiating a wire transfer. In some implementations, the message generator 224 can generate multiple instances of the email 375 which may be delivered to multiple recipients, such as a subset of all of the employees of the company. For example, the simulated attack manager 201 can select any number of employees who should be targeted by a simulated attack, and parameters corresponding to the identities of the selected targets can be stored in the memory 212. The message generator 224 can retrieve this information from the memory 212 and can generate a set of emails similar to the email 375, each addressed to a respective target identified in the information stored in the memory 212. That is, the message generator 224 can generate the emails such that the "From:" and "Subject:" fields of each email are identical, while the "To:" field is adjusted according to the desired targets.

After the target has received the simulated attack email 375, the target can send the reply email 377. For example, the target may reply to the simulated attack email 375 with the reply email 377 to inform the sender of the simulated attack email 375 that the target has completed a requested action, such as initiating a wire transfer. In another example, the target may reply to the simulated attack email 375 with the reply email 377 to provide other sensitive information to the sender of the simulated attack email 375. As shown, the reply email 377 includes the same "Subject:" field as the simulated attack email 375, however, the "To:" field of reply email includes a unique identifier. In some implementations, the unique identifier can be embedded in the local part of the "To:" field of the reply email 377 (i.e., the portion of the "To:" field of the reply email 377 before the "@" character). In other implementations, the unique identifier can be embedded in the domain part of the "To:" field of the reply email 377 (i.e., the portion of the "To:" field of the reply email 377 after the "@" character). In still other implementations, each of the local part and the domain part of the reply email 377 can include embedded unique identifiers. A unique identifier can be e.g., a string of letters, numbers, or special characters associated only with a particular target. Thus, all potential targets can have a different unique identifier. After the reply email 377 is sent, it can be received by the simulated attack server 202.

Figure 3B:
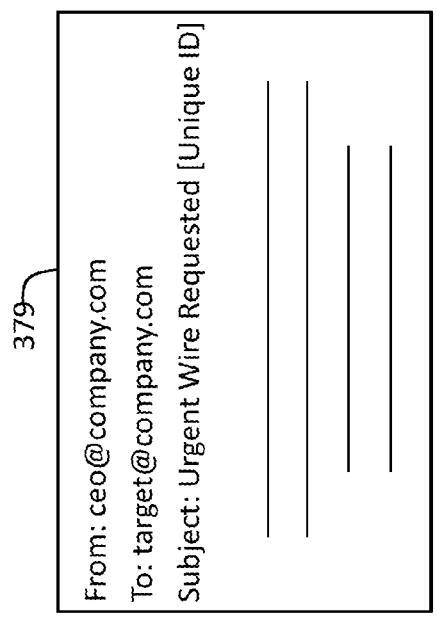

Another example format for a simulated attack email and a reply email is shown in FIG. 3B. In some implementations, the message generator 224 can generate the simulated attack email 379 including a "From:" field and a "To:" field similar to those of the simulated attack email 375 shown in FIG. 3A. The simulated attack email 379 differs from the simulated attack email 375 in that the simulated attack email 379 includes a unique identifier within its "Subject:" field. Thus, the message generator can generate the simulated attack email 379 such that the "Subject:" field of the simulated attack email 379 includes text corresponding to a request for the target to perform a certain action, but also includes a unique identifier associated with the target. For example, the unique identifier included in the "Subject:" field of the simulated attack email 379 can be a series of letters or numbers which may be disguised e.g., as an account number into which the target is requested to transfer funds.

When the target replies to the simulated attack email 379, the reply email 381 is created. The reply email 381 includes a "To:" field and a "Subject:" field that match the "From:" field and the "Subject:" field of the simulated attack email 379, respectively. As discussed above, the reply email 381 can be received by the simulated attack server 202 after the target sends the reply email 381.

Figure 3C:
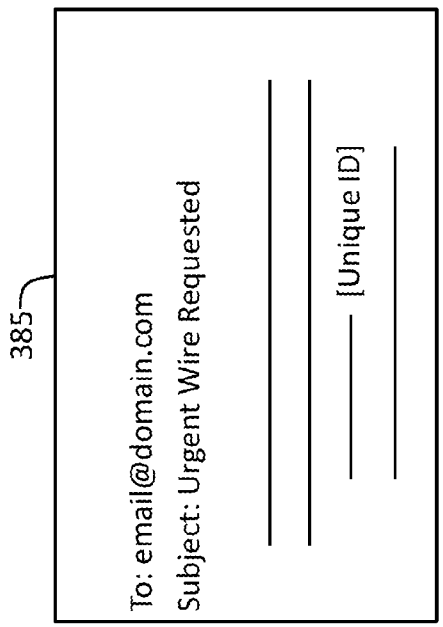
Figure 3C:
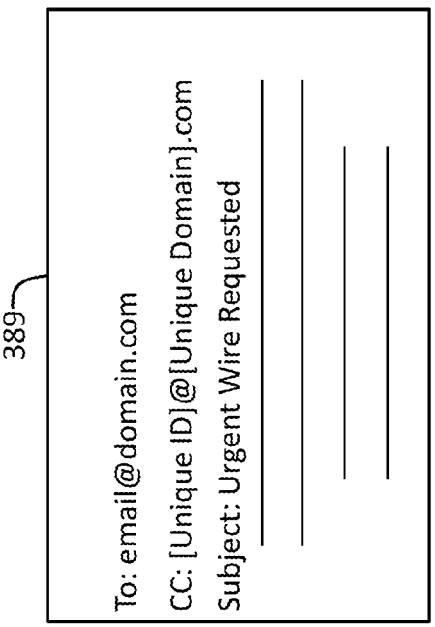

A third example format for a simulated attack email and a reply email is shown in FIG. 3C. The message generator 224 can generate the simulated attack email 383 including a "From:" field, a "To:" field, and a "Subject:" field similar to those of the simulated attack email 375 shown in FIG. 3A. The simulated attack email 383 differs from the simulated attack email 375 in that the body of the simulated attack email 383 includes a unique identifier. As described above, the unique identifier included within the body of the simulated attack email 383 can include any string of letters, numbers, or special characters that uniquely identifies the target from among other potential targets. For example, the unique identifier included in the body of the simulated attack email 383 can be a series of letters or numbers which may be disguised e.g., as an account number into which the target is requested to transfer funds.

When the target replies to the simulated attack email 383, the reply email 385 is created. The reply email 385 includes a "To:" field, a "Subject:" field, and a body that match the "From:" field, the "Subject:" field, and the body of the simulated attack email 383, respectively. Thus, the body of the reply email 385 also includes the unique identifier included within the body of the simulated attack email 383. In some implementations, the target may add additional text to the body of the reply email 385 without removing the unique identifier. As discussed above, the reply email 385 can be received by the simulated attack server 202 after the target sends the reply email 385.

Figure 3D:
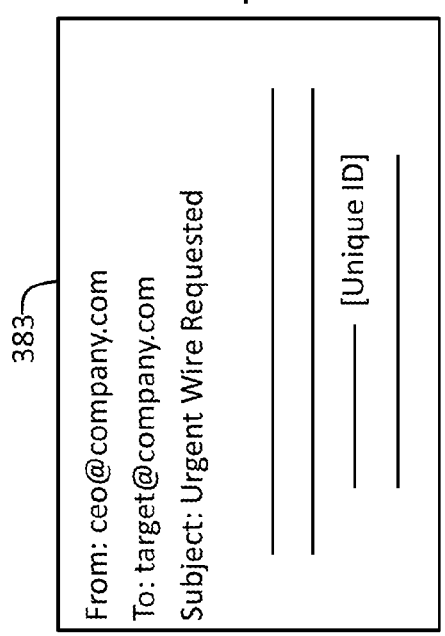
Figure 3D:
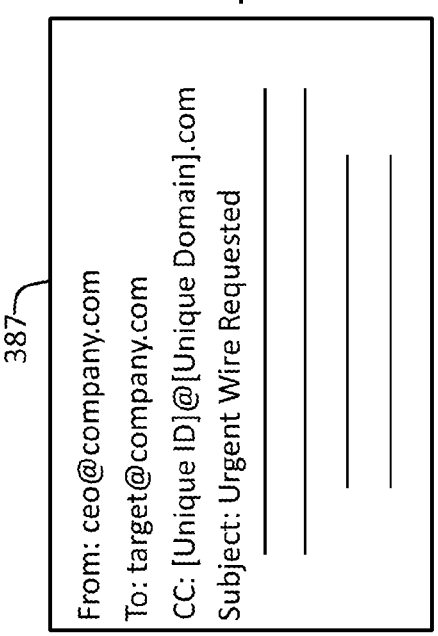

A fourth example format for a simulated attack email and a reply email is shown in FIG. 3D. The message generator 224 can generate the simulated attack email 387 including a "From:" field, a "To:" field, and a "Subject:" field similar to those of the simulated attack email 375 shown in FIG. 3A. The simulated attack email 387 differs from the simulated attack email 375 in that the simulated attack email 387 also includes a "CC:" field having a unique identifier. In some implementations, the unique identifier can be included in the local part of the "CC:" field of the simulated attack email 387. In other implementations, the unique identifier can be included in the domain part of the "CC:" field of the simulated attack email 387. In still other implementations, each of the local part and the domain part of the simulated attack email 387 can include unique identifiers. A unique identifier can be e.g., a string of letters, numbers, or special characters associated only with a particular target.

When the target replies to the simulated attack email 387, the reply email 389 is created. The reply email 389 includes a "To:" field, a "Subject:" field, and a "CC:" field that match the "From:" field, the "Subject:" field, and the "CC:" field of the simulated attack email 387, respectively. In some implementations, the target may add additional recipients to the "To:" field of the reply email 389 without removing the unique identifier from the "CC:" field. As discussed above, the reply email 389 can be received by the simulated attack server 202 after the target sends the reply email 389.

Figure 3E:
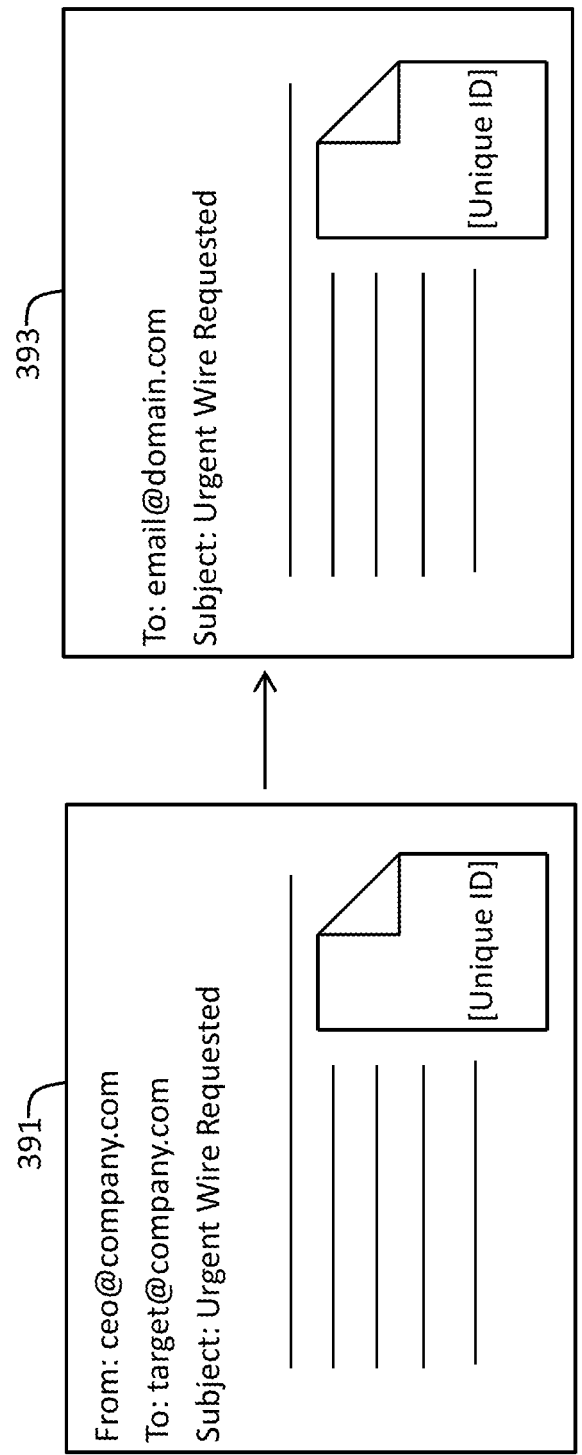

A fifth example format for a simulated attack email and a reply email is shown in FIG. 3E. The message generator 224 can generate the simulated attack email 391 including a "From:" field, a "To:" field, and a "Subject:" field similar to those of the simulated attack email 375 shown in FIG. 3A. The simulated attack email 391 differs from the simulated attack email 375 in that the simulated attack email 383 includes an attachment containing a unique identifier. As described above, the unique identifier included within the attachment of the simulated attack email 391 can include any string of letters, numbers, or special characters that uniquely identifies the target from among other potential targets. For example, the unique identifier included in the body of the simulated attack email 391 can be a series of letters or numbers which may be disguised e.g., as an account number into which the target is requested to transfer funds. In some implementations, the unique identifier may be included as text within the attachment of the simulated attack email 391. In some other implementations, the unique identifier may be included within a title or file name of the attachment of the simulated attack email 391. In still other implementations, the unique identifier may be included within metadata associated with the attachment of the simulated attack email 391.

When the target replies to the simulated attack email 391, the reply email 393 is created. The reply email 393 includes a "To:" field, a "Subject:" field, and a body that match the "From:" field, the "Subject:" field, and the body of the simulated attack email 391, respectively. Also included in the reply email 393 is the attachment having the unique identifier that was included in the simulated attack email 391. As discussed above, the reply email 393 can be received by the simulated attack server 202 after the target sends the reply email 393.

It should be understood that the simulated attack emails 375, 379, 383, 387, and 391, as well as the reply emails 377, 381, 385, 389, and 393 shown in FIGS. 3A-3E are illustrative only. The principles illustrated by the examples described above also can apply to other formats for simulated attack emails or reply emails without departing from the scope of this disclosure. For example, simulated attack emails and reply emails may include different text within their "From:," "To:," "Subject:," and "CC:" fields than that shown in FIGS. 3A-3E.

The system 200 includes also the target device 206. As described above, a target may be any target of a simulated phishing attack. For example, the target may be an employee, member, or independent contractor working for an organization that is e.g. performing a security checkup or conducts ongoing simulated phishing attacks to maintain security. The target device 206 may be any device used by the target. The target need not own the device for it to be considered a target device 206. The target device 206 may be any computing device, e.g. a desktop computer, a laptop, a mobile device, or any other computing device. In some implementations, the target device 206 may be a server or set of servers accessed by the target. For example, the target may be the employee or a member of an organization. The target may access a server that is e.g. owned or managed or otherwise associated with the organization. Such a server may be a target device 206.

In some implementations, the target device 206 may include a processor 256 and memory 258. The target device 206 may further include a user interface 260 such as, e.g., a keyboard, a mouse, a touch screen, or any other appropriate user interface. This may be a user interface that is e.g. connected directly to a target device 206, such as, for example, a keyboard connected to a mobile device, or may be connected indirectly to a target device 206, such as, for example, a user interface of a client device used to access a server target device 206. The target device 206 may include a display 262, such as, e.g., a screen, a monitor connected to the device in any manner, or any other appropriate display.

In an implementation, the target device 206 may include a messaging application 264. The message viewing application 264 may be any application capable of viewing, editing, and/or sending messages. For example, the messaging application 264 may be an instance of an application that allows viewing of a desired message type, such as any web browser, a Gmail™ application, Microsoft Outlook™, WhatsApp™, a text messaging application, or any other appropriate application. In some implementations, the messaging application 264 can be configured to display simulated attack emails, such as any of the simulated attack emails 375, 379, 383, 387, and 391 shown in FIGS. 3A-3E, respectively. Furthermore, the messaging application 264 can be configured to allow the target to generate reply messages in response to the messages displayed by the messaging application 264. For example, the messaging application 264 can be configured to allow the target to generate any of the reply emails 377, 381, 385, 389, and 393 shown in FIGS. 3A-3E, respectively.

In some implementations, the target device 206 may include a communications module 272. This may be a library, application programming interface (API), set of scripts, or any other code that may facilitate communications between the target device 206 and any of the simulated attack server 202, a third party server, or any other server. In some implementations, the communications module 272 determines when to transmit information from the target device 206 to external servers via a network. In some implementations, the information transmitted by the communications module 272 may correspond to a message, such as an email, generated by the messaging application 264.

In implementations, the simulated attack server 202 includes an attack results module 218. The attack results module 218 may include a database of the results of a one or more simulated phishing attacks. For example, the attack results module 218 may include data collected from targets, records of failures such as a listing of which targets replied to a simulated attack email, systemic or other security measures in place during the simulated phishing attacks, time or date logs, user identifiers, data detailing the results or analysis of attack results including data that indicates associations between attack results, and any other appropriate data. The attack results module 218 may be integrated with the attack management application 205 such that the simulated attack manager 201 may view, save, share, print, or perform any other appropriate action with the attack results. The attack results module 218 may perform analysis on the attack results, possibly upon request of the simulated attack manager 201. For example, this analysis may include determining which users are a security risk based on e.g. having a number of failures above a predetermined threshold, whether certain security systems in place are effective by e.g. correlating the presence of such security systems with a lower than average incidence of failures. The attack results module 218 may allow an attack manager to view, on a graphical user interface run by the attack management application 205, e.g. a timeline of overall failure rates, which may be useful in e.g. helping to determine whether a security policy that was instituted at a particular time was effective in improving security.

In some implementations, reply emails sent from the target device to the simulated attack server can be processed by the simulated attack module 220. For example, the simulated attack module 220 can be configured to process reply emails received from one or more target devices 206 to determine the identities of the targets who sent the reply emails. In some implementations, the identities of the targets may be determined based in part on the unique identifiers included within each reply email received by the simulated attack server.

In some implementations, the attack results module 218 can parse a reply email according to a predetermined or expected format of the reply email. For example, if the reply email is expected to be formatted in a manner similar to that of the reply email 377 shown in FIG. 3A, the attack results module 218 can be configured to parse the "To:" field of the reply email 377 to extract the unique identifier from one or both of the local part and the domain part of the email address included within the "To:" field. Similarly, if the reply email is expected to be formatted in a manner similar to that of the reply email 389 shown in FIG. 3D, the attack results module 218 can be configured to parse the "CC:" field of the reply email 389 to extract the unique identifier from one or both of the local part and the domain part of the email address included within the "CC:" field.

In some other implementations, the attack results module 218 can be configured to parse other portions of a reply email. For example, if the reply email is expected to be formatted in a manner similar to that of the reply email 381 shown in FIG. 3A, the attack results module 218 can be configured to parse the "Subject:" field of the reply email 381 to extract the unique identifier. In some other implementations, if the reply email is expected to be formatted in a manner similar to that of the reply email 385 shown in FIG. 3C, the attack results module 218 can be configured to parse the body of the reply email 385 to extract the unique identifier. In still other implementations, if the reply email is expected to be formatted in a manner similar to that of the reply email 393 shown in FIG. 3E, the attack results module 218 can be configured to parse the attachment of the reply email 393 to extract the unique identifier.

After the unique identifier has been extracted or identified from a reply email, the attack results module 218 can be configured to determine a match between the unique identifier and a target. For example, pairings of each potential target and their respective unique identifiers may be stored in the memory 212. In some implementations, the potential targets may correspond to the employees of a company or the members of another type of organization, and each target may be associated with a unique identifier. The attack results module 218 can retrieve these pairings from the memory 212, and can determine which target is associated with the unique identifier that was previously extracted from the reply email. In some implementations, the attack results module 218 can identify the matched target as having failed the test represented by the simulated attack, because the target replied to the simulated attack email. The attack results module 218 can be configured to record the failure of the target, for example, in the memory 212.

The system 200 may include a network 208. The network 208 may be any type and/or form of network. The geographical scope of the network 208 may vary widely and the network 208 can be a body area network (BAN), a personal area network (PAN), a local-area network (LAN), e.g.

Intranet, a metropolitan area network (MAN), a wide area network (WAN), or the Internet. The topology of the network 208 may be of any form and may include, e.g., any of the following: point-to-point, bus, star, ring, mesh, or tree. The network 208 may be an overlay network which is virtual and sits on top of one or more layers of other networks 208'. The network 208 may be of any such network topology as known to those ordinarily skilled in the art capable of supporting the operations described herein. The network 208 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 208 may be a type of a broadcast network, a telecommunications network, a data communication network, or a computer network.

Figure 4:
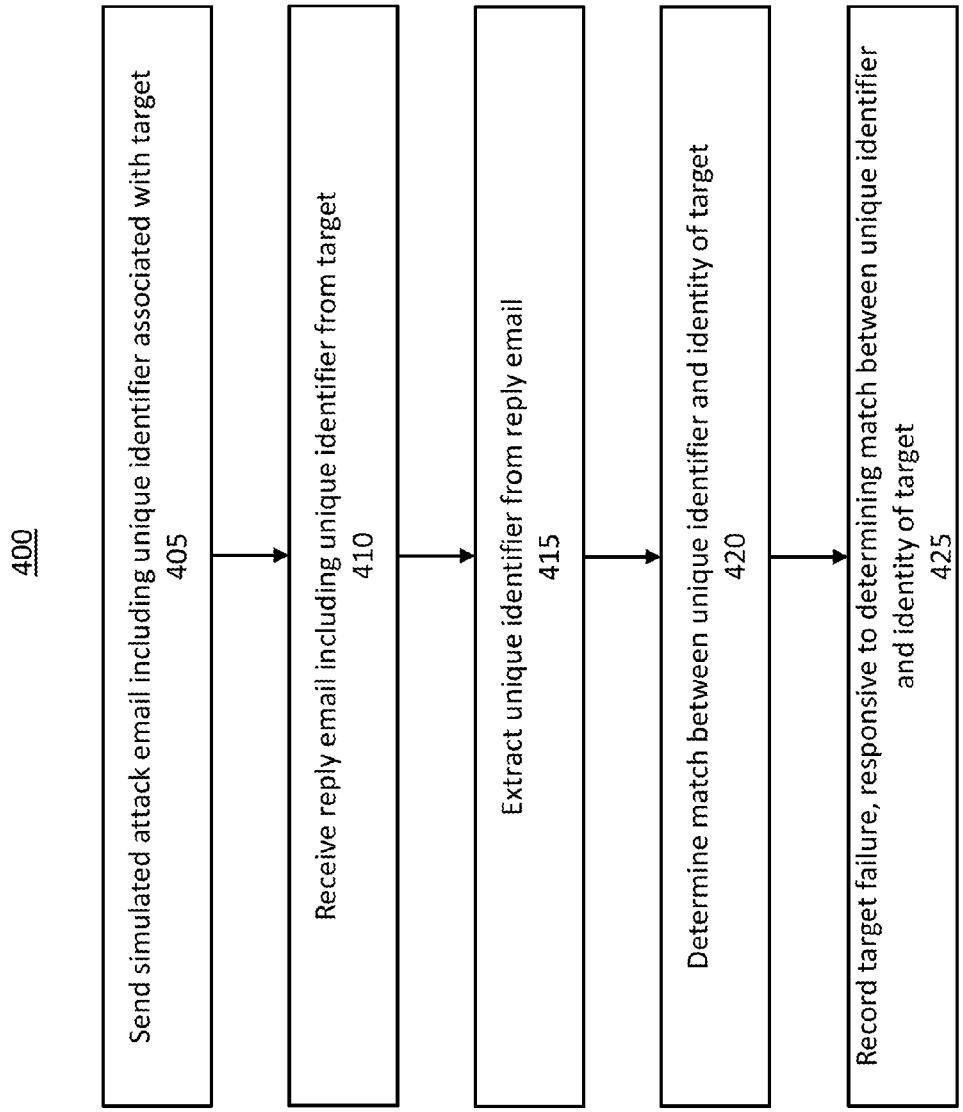
FIG. 4 depicts an implementation of a method for performing a simulated phishing attack.

Referring to FIG. 4 in a general overview, FIG. 4 depicts an implementation of a method 400 for performing a simulated phishing attack. In brief overview, the method 400 can include sending, by a simulated attack server, a simulated attack email including a unique identifier to a target (step 405). The method 400 can include receiving, by the simulated attack server, a reply email including a unique identifier from the target (step 410). The method 400 can include extracting, by the simulated attack server, the unique identifier from the reply email (step 415). The method 400 can include determining, by the simulated attack server, a match between the unique identifier and the identity of the target (step 420). The method also can include recording, by the simulated attack server, a target failure, responsive to determining the match between the unique identifier and the identity of the target (step 425).

Referring again to FIG. 4, and in greater detail, the method 400 can include sending, by a simulated attack server, a simulated attack email including a unique identifier to a target (step 405). In some implementations, the simulated attack server can include a message generator, such as the message generator 224 shown in FIG. 2, that is configured to generate and/or send the simulated attack email. The message generator can be configured to include a unique identifier in the simulated attack email. In some implementations, the unique identifier can be any combination of letters, numbers, or special characters that is uniquely associated with the target to which the simulated attack email is sent. For example, the unique identifier can be a string of characters included in the "From:" field, the "CC:" field, the "Subject:" field, or the body of the simulated attack email. In other examples, the unique identifier may be included in a file that is attached to the simulated attack email. In some implementations, the message generator can generate the simulated attack email such that the email appears to be delivered from a trusted source, such as an executive of the company at which the target is employed. The simulated attack email also can include text requesting that the target perform a specific action (such as replying to the simulated attack email) or provide access to sensitive information, which also may be sent via reply email.

The method 400 can include receiving, by the simulated attack server, a reply email including a unique identifier from the target (step 410). In some implementations, the reply email can be sent to an email address having a domain name that is owned by the organization performing the simulated phishing attack, which can help to ensure that the reply email is received by the simulated attack server. In some implementations, the reply email can include the unique identifier that was included in the simulated attack email.

The method 400 can include extracting, by the simulated attack server, the unique identifier from the reply email (step 415). In some implementations, the unique identifier can be extracted by an attack results module similar to the attack results module 218 shown in FIG. 2. The attack results module can identify or extract the unique identifier by parsing the reply email according to a predetermined or expected format of the reply email. In some implementations, the format of the reply email can be determined based in part on the format of the simulated attack email sent to the target in step 405. For example, if the unique identifier was included in the "Subject:" or "CC:" field of the simulated attack email, the attack results module can be configured to parse the "Subject:" or "CC:" fields of the reply email to extract the unique identifier. Similarly, if the unique identifier was included in the body of the simulated attack email or in an attachment associated with the simulated attack email, the attack results module can be configured to parse the body of the attachments of the reply email to extract the unique identifier. In yet another implementation, the attack results module can be configured to parse the "To:" field of the reply email to extract the unique identifier.

The method 400 can include determining, by the simulated attack server, a match between the unique identifier and the identity of the target (step 420). In some implementations, the match can be determined by an attack results module similar to the attack results module 218 shown in FIG. 2. For example, as described above, pairings of each potential target and their respective unique identifiers may be stored in a memory. In some implementations, the potential targets may correspond to the employees of a company or the members of another type of organization, and each target may be associated with a unique identifier. The attack results module can retrieve these pairings from the memory, and can determine which target is associated with the unique identifier that was previously extracted from the reply email in step 415. In some implementations, the attack results module can identify the matched target as having failed the test represented by the simulated attack, because the target replied to the simulated attack email. The method also can include recording, by the simulated attack server, a target failure, responsive to determining the match between the unique identifier and the identity of the target (step 425). In some implementations, the failure can be recorded by the attack results module that identified the match between the unique identifier and the identity of the target in step 420. The attack results module can record the failure of the target, for example, in a memory associated with the simulated attack server, such as the memory 212 shown in FIG. 2.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method for identifying users that reply to a simulated phishing email, the method comprising:
   (a) establishing, by one or more servers comprising a processor coupled to memory, a unique identifier for each user of a plurality of users to receive a simulated phishing email via a simulated phishing campaign;
   (b) generating, by the one or more servers, for each user of the plurality of users a simulated phishing email to comprise the unique identifier of the respective user embedded in at least one of a subject line of the simulated phishing email, a body of the simulated phishing email or an attachment of the simulated phishing email;
   (c) communicating, by the one or more servers, the respective simulated phishing email to an email account corresponding to each user of the plurality of users, the respective simulated phishing email comprising an email address in a to field that corresponds to the one or more servers;
   (d) receiving, by the one or more servers, a reply email to the email address communicated responsive to the respective simulated phishing email from the email account of at least one user of the plurality of users, the reply email comprising the unique identifier; and
   (e) determining by the one or more servers, that the at least one user has replied to the simulated phishing email by comparing the unique identifier embedded in the reply email to the unique identifier established by the one or more servers for the at least one user.

2. The method of claim 1, wherein (a) further comprises establishing, by the one or more servers, the unique identifier to identify a user corresponding to one or more email accounts.

3. The method of claim 1, wherein (b) further comprises generating the simulated phishing email by embedding the unique identifier of the respective user to be invisible in the body of the simulated phishing email.

4. The method of claim 1, wherein (b) further comprises generating the simulated phishing email by embedding the unique identifier of the respective user in a file name of the attachment.

5. The method of claim 1, wherein (b) further comprises generating the simulated phishing email by embedding the unique identifier of the respective user in content of the attachment.

6. The method of claim 1, wherein (d) further comprises receiving, by the one or more servers, the reply email sent to a domain of or hosted by the one or more servers.

7. The method of claim 1, wherein (e) further comprises identifying, by the one or more servers, the unique identifier embedded in at least one of the subject line of the simulated phishing email, the body of the simulated phishing email or the attachment of the simulated phishing email.

8. A system for identifying users that reply to a simulated phishing email, the system comprising:
   one or more servers comprising a processor coupled to memory, and configured to establish a unique identifier for each user of a plurality of users to receive a simulated phishing email via a simulated phishing campaign;
   a campaign manager of the one or more servers configured to:
      generate for each user of the plurality of users a simulated phishing email to comprise the unique identifier of the respective user embedded in at least one of a subject line of the simulated phishing email, a body of the simulated phishing email or an attachment of the simulated phishing email; and
      communicate the respective simulated phishing email to an email account corresponding to each user of the plurality of users, the respective simulated phishing email comprising an email address in a to field that corresponds to the one or more servers;
   wherein the one or more servers are configured to receive a reply email to the email address communicated responsive to the respective simulated phishing email from the email account of at least one user of the plurality of users, the reply email comprising the unique identifier; and
   wherein the campaign manager is configured to determine that the at least one user has replied to the simulated phishing email by comparing the unique identifier embedded in the reply email to the unique identifier established by the one or more servers for the at least one user.

9. The system of claim 8, wherein the one or more servers are further configured to establish the unique identifier to identify a user corresponding to one or more email accounts.

10. The system of claim 8, wherein the campaign manager is further configured to generate the simulated phishing email by embedding the unique identifier of the respective user to be invisible in the body of the simulated phishing email.

11. The system of claim 8, wherein the campaign manager is further configured to generate the simulated phishing email by embedding the unique identifier of the respective user in a file name of the attachment.

12. The system of claim 8, wherein the campaign manager is further configured to generate the simulated phishing email by embedding the unique identifier of the respective user in content of the attachment.

13. The system of claim 8, wherein the one or more servers are further configured to receive the reply email sent to a domain of or hosted by the one or more servers.

14. The system of claim 8, wherein the campaign manager is further configured to identify the unique identifier embedded in at least one of the subject line of the simulated phishing email, the body of the simulated phishing email or the attachment of the simulated phishing email.

15. A method for identifying users that reply to a simulated phishing email, the method comprising:
(a) establishing, by one or more servers comprising a processor coupled to memory, a unique identifier for each user of a plurality of users to receive a simulated phishing email via a simulated phishing campaign;
(b) generating, by the one or more servers, for each user of the plurality of users a simulated phishing email to comprise the unique identifier of the respective user embedded in an email address of one of a plurality of address fields of the simulated phishing email;
(c) communicating, by the one or more servers, the respective simulated phishing email to an email account corresponding to each user of the plurality of users, the respective simulated phishing email comprising an email address in a to field that corresponds to the one or more servers;
(d) receiving, by the one or more servers, a reply email to the email address communicated responsive to the respective simulated phishing email from the email account of at least one user of the plurality of users, the reply email comprising the unique identifier in an address field of the plurality of address fields; and
(e) determining by the one or more servers, that the at least one user has replied to the simulated phishing email by comparing the unique identifier embedded in the email address field of the reply email to the unique identifier established by the one or more servers for the at least one user.

16. The method of claim 15, wherein (a) further comprises establishing, by the one or more servers, the unique identifier to identify one or more email accounts.

17. The method of claim 15, wherein (b) further comprises generating the simulated phishing email by embedding the unique identifier of the respective user in a to field of the simulated phishing email.

18. The method of claim 15, wherein (b) further comprises generating the simulated phishing email by embedding the unique identifier of the respective user in a cc field of the simulated phishing email.

19. The method of claim 15, wherein (b) further comprises generating the simulated phishing email by embedding the unique identifier of the respective user prior to an @ sign in the email address in one of the plurality of address fields.

20. The method of claim 15, wherein (b) further comprises generating the simulated phishing email by embedding the unique identifier of the respective user after an @ sign in the email address in one of the plurality of address fields.

21. The method of claim 15, wherein (d) further comprises receiving, by the one or more servers, the reply email sent to a domain of or hosted by the one or more servers.

22. The method of claim 15, wherein (e) further comprises identifying, by the one or more servers, the unique identifier embedded in the address field of the simulated phishing email comprising one of a from field or a cc field.

23. A system for identifying users that reply to a simulated phishing email, the system comprising:
one or more servers comprising a processor coupled to memory and configured to establish a unique identifier for each user of a plurality of users to receive a simulated phishing email via a simulated phishing campaign;
a campaign manager of the one or more servers configured to:
generate for each user of the plurality of users a simulated phishing email to comprise the unique identifier of the respective user embedded in an email address of one of a plurality address fields of the simulated phishing email; and
communicate the respective simulated phishing email to an email account corresponding to each user of the plurality of users, the respective simulated phishing email comprising an email address in a to field that corresponds to the one or more servers;
wherein the one or more servers are configured to receive a reply email to the email address communicated responsive to the respective simulated phishing email from the email account of at least one user of the plurality of users, the reply email comprising the unique identifier in an address field of the plurality of address field; and
wherein the campaign manager is further configured to determine that the at least one user has replied to the simulated phishing email by comparing the unique identifier embedded in the address field of the reply email to the unique identifier established by the one or more servers for the at least one user.

24. The system of claim 23, wherein the one or more servers are further configured to generate the unique identifier to identify one or more email accounts.

25. The system of claim 23, wherein the campaign manager is further configured to generate the simulated phishing email by embedding the unique identifier of the respective user in a to field of the simulated phishing email.

26. The system of claim 23, wherein the campaign manager is further configured to generate the simulated phishing email by embedding the unique identifier of the respective user in a cc field of the simulated phishing email.

27. The system of claim 23, wherein the campaign manager is further configured to generate the simulated phishing email by embedding the unique identifier of the respective user prior to an @ sign in the email address in one of the plurality of address fields.

28. The system of claim 23, wherein the campaign manager is further configured to generate the simulated phishing email by embedding the unique identifier of the respective user after an @ sign in the email address in one of the plurality of address fields.

29. The system of claim 23, wherein the one or more servers are further configured to receive the reply email sent to a domain of or hosted by the one or more servers.

30. The system of claim 23, wherein the campaign manager is further configured to identify the unique identifier embedded in the address field of the simulated phishing email comprising one of a from field or a cc field.

* * * * *